Feb. 11, 1964   M. C. BURK   3,121,160
ELECTRICAL MEASURING APPARATUS
Filed Nov. 13, 1961   2 Sheets-Sheet 1

INVENTOR.
M. C. BURK
BY
Young & Quigg
ATTORNEYS

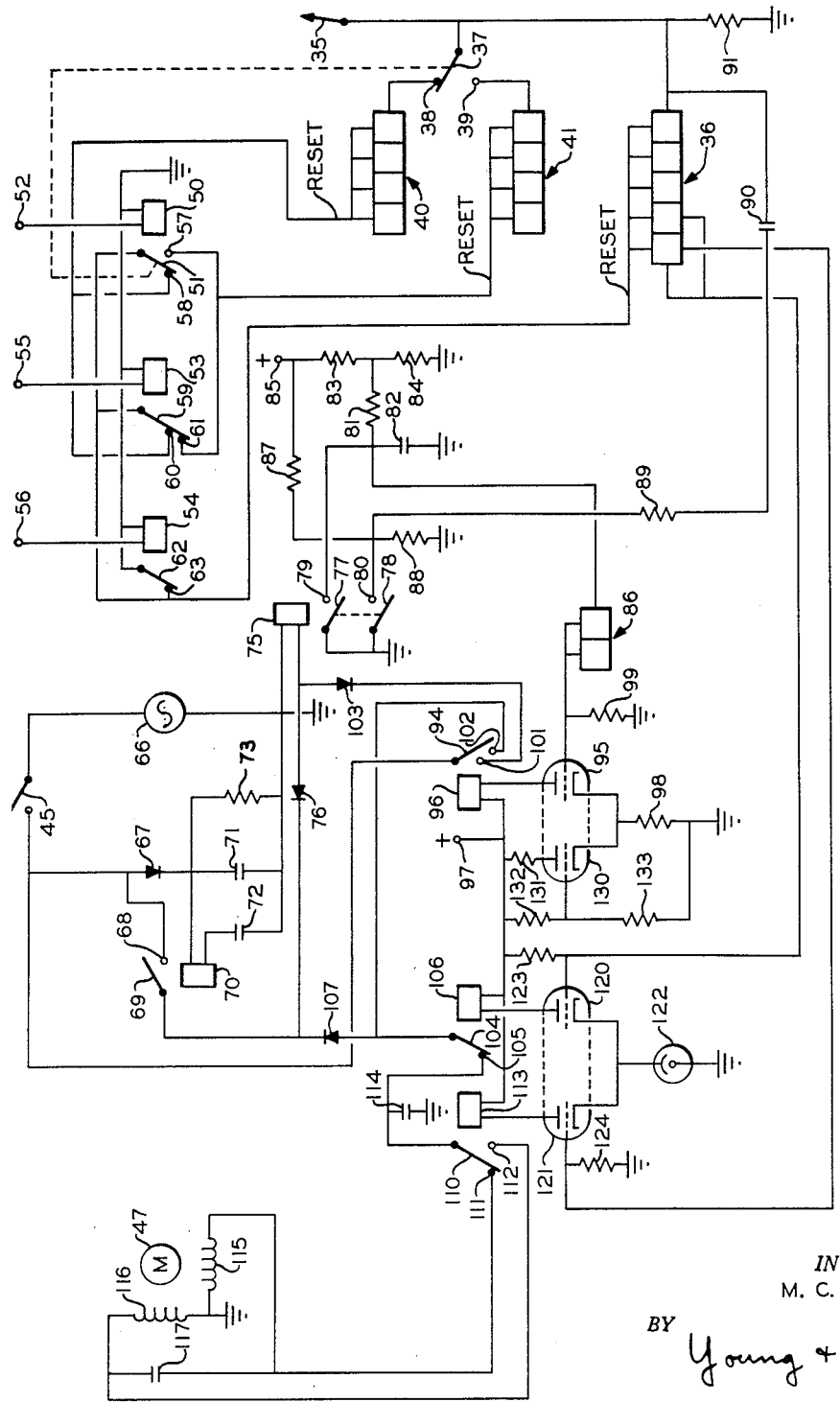

United States Patent Office 3,121,160
Patented Feb. 11, 1964

3,121,160
ELECTRICAL MEASURING APPARATUS
Marvin C. Burk, Bartlesville, Okla., assignor to Phillips Petroleum Company, a corporation of Delaware
Filed Nov. 13, 1961, Ser. No. 151,947
15 Claims. (Cl. 235—92)

This invention relates to measuring and recording a plurality of signals which are received in sequence.

Several types of analytical instruments are known which provide a plurality of output signals in sequence that are representative of the individual components of a material being analyzed. One such analyzer utilizes the principles of chromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varying either a magnetic field which deflects the charged particles or a potential which accelerates the charged particles toward the collector, the associated detector responds in sequence to charged particles having different masses. The detector circuit normally provides an output voltage representative of the rate of impingement of charged particles on the collector.

Heretofore, it has been the general practice to measure or record directly the analog voltages established by the detecting circuits of such analyzers. However, these recorded voltages can not always be identified or interpreted readily by an operator in an industrial plant. In addition, it is often difficult for an operator to calculate the concentration of individual components of a sample mixture from the recorded voltages.

In accordance with the present invention, a system is provided for converting a plurality of voltage signals which are received in sequence into coresponding fluctuating signals, the frequencies of which are proportional to the amplitudes of the received voltage signals. The total number of pulses of each fluctuating signal is then counted so that a digital output signal is provided that is representative of the magnitude of the original voltage signal. In addition, the total number of pulses received from a complete analysis is counted and recorded. In this manner, it is possible to divide the counts representative of the individual components by the total counts to determine the percentages of the individual constituents of the mixture being analyzed.

Accordingly, it is an object of this invention to provide improved apparatus for measuring and recording a plurality of signals which are received in sequence.

Another object is to provide apparatus for converting voltage signals into electrical pulses, the numbers of which are representative of the magnitudes of the voltage signals.

A further object is to provide improved recording apparatus for use with analytical instruments.

Other objects, advantages and features of the invention should become apparent from the following detailed description, taken in conjunction with the accompanying drawing in which:

FIGURE 3 is a detailed circuit drawing of the timing mechanism and balancing system of the circuit of FIGURE 2.

Figure 1:
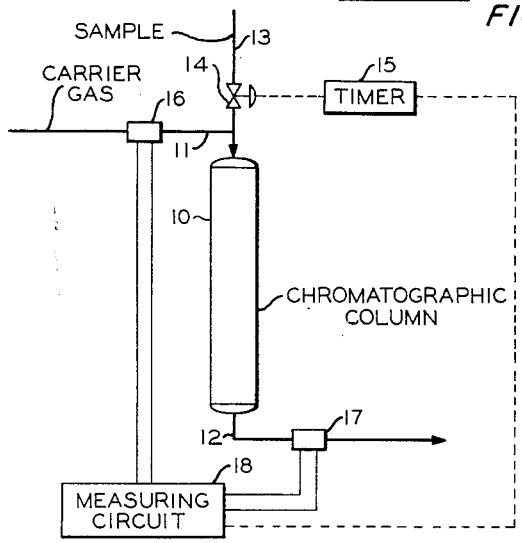
FIGURE 1 is a schematic representation of a chromatographic analyzer having the measuring circuit of this invention associated therewith.

Referring now to the drawing in detail and to FIGURE 1 in particular, there is shown a conventional chromatographic column 10 which is filled with a packing material that selectively retards passage therethrough of constituents of a fluid mixture to be analyzed. A carrier gas is introduced into the first end of column 10 through a conduit 11. A conduit 12 removes the effluent from column 10. A sample conduit 13, having a control valve 14 therein, communicates with the first end of column 10. Valve 14 is opened periodically for a preselected time interval by means of timer 15 so as to introduce a predetermined volume of fluid sample to be measured into column 10. Although shown schematically, valve 14 can be any type of sample valve known in the art which permits the introduction of a predetermined volume of fluid sample.

Figure 2:
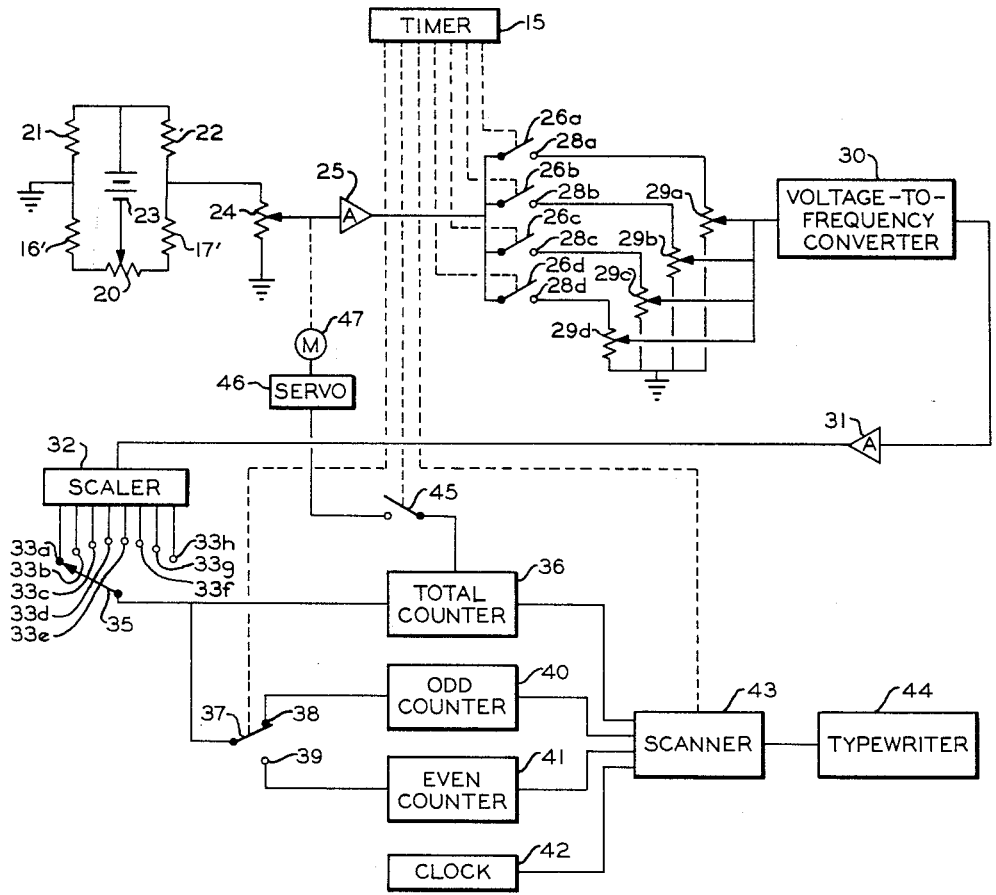
FIGURE 2 is a schematic circuit drawing of the measuring circuit of FIGURE 1.

First and second sensing elements 16 and 17 are disposed in respective conduits 11 and 12. These elements are adapted to compare a property of the fluid flowing through the two conduits to provide an indication of differences therebetween. These detecting elements are advantageously temperature sensitive resistance elements 16' and 17', as shown in FIGURE 2. The detecting elements are connected into a measuring circuit 18 which is described hereinafter in detail. Before the sample fluid is introduced into column 10, carrier gas flows through conduits 11 and 12 so that elements 16 and 17 respond to the same fluid and have identical outputs. Valve 14 is then opened to introduce a sample into column 10. The carrier gas elutes the constituents of the sample from the column in sequence so that element 17 responds sequentially to these individual constituents.

The resistances of temperature sensitive elements 16' and 17' are compared by means of a bridge network which is illustrated in FIGURE 2. First terminals of elements 16' and 17' are connected to the respective end terminals of a potentiometer 20. Resistance elements 21 and 22 are connected in series between the second terminals of elements 16' and 17'. A voltage source 23 is connected between the contactor of potentiometer 20 and the junction between elements 21 and 22. The junction between elements 16' and 21 is connected to ground. The junction betwen elements 17' ad 22 is connected to the first end terminal of a potentiometer 24, the second end terminal of which is connected to ground.

When carrier gas alone is flowing through conduits 11 and 12, the bridge is balanced by adjusting the contactor of potentiometer 20 until the potential at the junction between elements 17' and 22 is zero. The presence of sample constituents in effluent conduit 12 changes the termal conductivity of the gas flowing through this conduit so as to change the resistance of temperature sensitive resistance element 17'. This unbalances the bridge network so that a potential appears at the output terminal between elements 17' and 22.

The contractor of potentiometer 24 is connected to the input of an amplifier 25. The output of amplifier 25 is connected to switches 26a, 26b, 26c and 26d. These switches are adapted to be closed in sequence by timer 15 so as to engage respective terminals 28a, 28b, 28c and 28d. These terminals are connected to the respective first end terminals of potentiometers 29a, 29b, 29c and 29d. The second end terminals of the potentiometers are connected to ground. The contactors of the four potentiometers are connected to the input of a voltage-to-frequency converter 30.

The contactor of potentiometer 24 is adjusted automatically in the manner described hereinafter so as to vary the gain of the measuring circuit. Amplifier 25 is employed to increase the bridge output signal to a suitable level for measurement purposes. Switches 26a, 26b, 26c and 26d and the associated potentiometers provide an attenuation network such that the bridge unablance signals representative of the individual components can be adjusted selectively to compensate for different thermal conductivities of these individual components. Although only four attenuating potentiometers are illustrated, it should be evident that the circuit can be provided with as many potentiometers as are required to compensate for the different components of the sample being analyzed. Timer 15 controls the switches 26a to 26d so that signals representative of the individual components are applied to the proper potentiometer to give the desired attenuation. The initial adjustment of timer 15 is made following an analysis of a sample having known constituents. This determines the times at which selected constituents appear in the column effluent. Voltage-to-frequency converter 30 provides an output alternating signal, the frequency of which is directly proportional to the magnitude of the input voltage. A suitable converter for this purpose is the DY-2210 converter, manufactured by Dymec Inc., Palo Alto, California, and which is described in Control Engineering, March 1959, page 144.

The output of converter 30 is applied through an amplifier 31 to the input of a scaler 32. Amplifier 31 is employed to increase the voltage of the fluctuating signal to a convenient value. Scaler 32 is provided with a plurality of output terminals 33a, 33b, 33c, 33d, 33e, 33f, 33g and 33h. The scaler comprises a plurality of frequency dividing circuits such that the frequencies of the output signals are preselected fractions of the frequency F of the input signal. Thus, the frequencies of the signals at terminals 33a to 33h can be F, F/2, F/4, F/8, F/16, F/32, F/64 and F/128, respectively, for example. A manually adjustable switch 35 is adapted to engage terminals 33a to 33h selectively. Switch 35 is connected to the input of a total counter circuit 36 and to a switch 37. Switch 37 is actuated by timer 15 so as to engage terminals 38 and 39 alternately. Terminals 38 and 39 are connected to the inputs of odd counter 40 and even counter 41 respectively. These counters can be commercially available binary counters, for example.

The output signal of converter 30 is thus applied through amplifier 31 and scaler 32 to total counter 36 during the complete cycle of analysis so that a count is registered thereon representative of the total concentration of all of the components of the sample being measured. Timer 15 actuates switch 37 so that signals representative of the odd number of components which appear in the column effluent are counted by odd counter 40 and the even number of components are counted by even counter 41. A clock mechanism 42 is adapted to provide output signals representative of time. A scanner 43, which is also controlled by timer 15, applies the output signals from counters 36, 40 and 41 and clock 42 to a recording system such as a typewriter 44. At the beginning or at the end of the analysis cycle, the scanner applies a signal from clock 42 to the typewriter. The output signals of odd and even counters 40 and 41 are alternately transmitted to typewriter 44 during the analysis. A reset mechanism, which is described hereinafter in conjunction with FIGURE 3, resets these counters after the individual signals have been recorded and prior to the arrival of the next signal. After all of the components have been detected, the total count from counter 36 is transmitted to typewriter 44. The total counter is then finally reset to prepare for the next cycle of analysis.

At the end of the analysis cycle, but before total counter 36 is reset, a signal from total counter 36 is transmitted through a switch 45, which is closed by timer 15, to the input of a servo unit 46. It is desirable to maintain the gain of the detecting circuit such that the total number of counts received by counter 36 remains constant for each analysis cycle. If the actual number of counts differs from this preselected value, servo mechanism 46 actuates a motor 47 to adjust the contactor of potentiometer 24 to vary the gain of the detector circuit. This tends to return the total number of counts to the desired value for the next analysis cycle.

The apparatus employed to reset counters 36, 40 and 41 is illustrated in FIGURE 3. Switch 37 is actuated by a relay coil 50 which also actuates a switch 51. The first terminal of relay coil 50 is connected to terminal 52, and the second terminal of relay coil 50 is connected to ground. The first terminals of additional relay coils 53 and 54 are connected to respective terminals 55 and 56. The second terminals of relay coils 53 and 54 are connected to ground. Switch 51 engages terminals 57 and 58 when relay coil 50 is energized and deenergized, respectively. A switch 59 engages terminals 60 and 61 when relay coil 53 is deenergized. A switch 62 engages a terminal 63 when relay coil 54 is deenergized. Terminals 63, 60 and 61 are connected to the reset mechanisms of respective counters 36, 40 and 41. Switch 62 is connected to ground. Switches 51 and 59 are connected to terminal 63.

The reset mechanisms of the counters are constructed so that the counters operate to record when this mechanism is grounded. The counters are reset when the ground connections are broken. Control signals are applied to terminals 52, 55 and 56 by timer 15 of FIGURE 2 to actuate the reset mechanism. A potential is either applied to or removed from terminal 52 each time a different component of the sample mixture appears in the column effluent. This serves to switch the signal from scaler 32 of FIGURE 2 to the odd or even counter, as controlled by switch 37. The counter which is not receiving an input signal is reset after the signal stored thereon has been read by scanner 43. A pulse is applied to terminal 56 for a short time interval before potentials are applied to and withdrawn from terminal 52.

In the absence of potentials being applied to any of the relay coils, the reset mechanisms of the three counters are connected to ground, as illustrated. Relay coil 53 is first energized momentarily to open switch 59. This removes the ground connection from counter 41. Counter 40 receives output pulses at this time because switch 37 engages terminal 38. Timer 15 then applies a potential to terminal 52 to energize relay coil 50. This moves switch 37 into engagement with terminal 39 so that counter 41 receives the next output pulses. At the same time, switch 51 is moved into engageemnt with terminal 57. This connects the reset mechanism of counter 41 to terminal 63 so that it remains grounded as long as relay coil 54 is not energized. When it is desired to reset all of the counters, a pulse is applied to terminal 56 to energize relay coil 54. This moves switch 62 out of engagement with terminal 63 so that the ground connections to all of the reset mechanisms are broken.

As previously mentioned, it is desirable to adjust the gain of the detector circuit periodically so that total number of counts remains substantially constant for each analysis. Switch 45 connects the first terminal of an alternating current source 66 to the first terminal of a rectifier 67 and to a terminal 68 which is adapted to be engaged by a switch 69 when a relay coil 70 is energized. The second terminal of rectifier 67 is connected to the first terminal of a capacitor 71 and to the first terminal of relay coil 70. The second terminal of relay coil 70 is connected to the first terminal of a capacitor 72. The second terminals of capacitors 71 and 72 are connected to the grounded second terminal of current source 66. A resistor 73 is connected in parallel with capacitor 71. The first terminal of a relay coil 75 is connected to ground. The second terminal of relay coil 75 is connected through a rectifier 76 to switch 69. When relay coil 75 is energized, switches 77 and 78 move into engagement with respective terminals 79 and 80. Terminal 79 is connected to the junction between a resistor 81 and a capacitor 82. The second terminal of capacitor 82 is connected to ground. The second terminal of resistor 81 is connected to the junction between resistors 83 and 84. The second terminals of resistors 84 and 83 are connected to ground and to a positive potential 85, respectively. Terminal 79 is also connected directly to the inputs of a counter 86. Terminal 80 is connected to the junction between resistors 87 and 88. The second terminals of resistors 87 and 88 are connected to terminal 85 and to ground, respectively. Terminal 80 is also connected through a resistor 89 and a capacitor 90 to the input of total counter 86. A resistor 91 is connected between switch 37 and ground.

The output of counter 86 is applied to the control grid of a triode 95. The anode of triode 95 is connected through a relay coil 96 to a positive potential terminal 97. The cathode of triode 95 is connected to ground through a resistor 98, and the control grid of triode 95 is connected to ground through a resistor 99. A switch 94 is moved into engagement with terminals 101 and 102 when relay coil 96 is energized. The second terminal of relay coil 75 is connected through a rectifier 103 to terminal 101. Terminal 102 is connected to a switch 104 which moves out of engagement with a terminal 105 when a relay coil 106 is energized. Switch 94 is also connected through switch 45 to current source 66. A rectifier 107 is connected between switch 104 and switch 69.

In order to describe the operation of the gain adjusting network, it will be assumed that the desired total number of counts to be recorded on counter 36 for a complete analysis is 1,000. In the event that the total number of counts actually recorded is less than 1,000, motor 47 adjusts the contactor of potentiometer 24 to increase the magnitude of the signal removed therefrom. This tends to increase the number of counts recorded during the following analysis period. Conversely, motor 47 moves the contactor of potentiometer 24 in the opposite direction if the total number of counts exceeds 1,000. The circuit illustrated in FIGURE 3 is adapted to provide for rotation of motor 47 in one of two directions, depending upon the magnitude of the total count.

The circuit thus far described operates to add a predetermnied number of counts to the total signal originally recorded on counter 36. This number can be 100, for example. Closure of switch 45 by timer 15 results in current flow through rectifier 67 and relay coil 70 to charge capacitor 72. This current pulse energizes the relay coil to close switch 69. A current pulse then flows through relay coil 75 and rectifier 76. This closes switches 77 and 78 so that a pulse is applied to the input of counter 86 from the voltage dividing network associated with switch 77. Counter 86 provides an output potential whenever the counter registers from one to 100. This potential is applied to the control grid of triode 95 to cause conduction thereof to energize relay coil 96. This moves switch 94 into engagement with terminal 102 such that a current path is established from ground through relay coil 75, rectifier 103, switch 94 and switch 45 to current source 66. Relay coil 70 becomes deenergized after the first cycle of current is applied from source 66 because the charge on capacitor 72 prevents the flow of current through relay coil 70 from rectifier 67 on following half cycles of applied current. However, each half cycle of applied current energizes relay coil 75 such that a series of pulses is applied to the input of counter 86. This operation continues until 100 pulses are applied to counter 86. The output of the counter drops to zero when the next pulse is received, with the result that relay coil 96 is deenergized. This breaks the circuit to relay coil 75 so that the generation of pulses is terminated. Since a pulse is also applied to the input of counter 36 through resistor 89 and capacitor 90 each time switch 78 is closed by relay coil 75, 100 counts are added to the total number of counts originally stored on counter 36.

Terminal 105 is connected to a switch 110 which engages terminals 111 and 112 when a relay coil 113 is deenergized and energized, respectively. A capacitor 114 is connected between terminal 105 and ground. Terminals 111 and 112 are connected to first end terminals of respective windings 115 and 116 of motor 47. The second terminals of these windings are connected to ground. A capacitor 117 is connected across terminals 111 and 112.

Closure of switch 94 by relay coil 96 connects current source 66 to switch 104 through relay coil 75 and rectifier 103. If relay coil 106 is deenergized, switch 104 is connected to terminal 105 which is connected to switch 110. Thus, current source 66 is connected to the windings of motor 47. If switch 110 is in engagement with terminal 111, the current source is connected directly to winding 115 and through capacitor 117 to winding 116. If switch 110 is in engagement with terminal 112, the current source is connected directly to winding 116 and through capacitor 117 to winding 115. The direction of rotation of motor 47 thus depends on the position of switch 110. However, current is not supplied to motor 47 unless relay coil 106 is deenergized.

Relay coils 106 and 113 are energized by conduction taking place through respective triodes 120 and 121. The anodes of triodes 120 and 121 are connected to terminal 97 through respective relay coils 106 and 113. The cathodes of triodes 120 and 121 are connected to ground through a voltage regulating tube 122. The control grid of triode 120 is connected to counter 36, as is the control grid of triode 121. A resistor 123 is connected between the control grid of triode 120 and terminal 97. A resistor 124 is connected between control grid of triode 121 and ground.

The connections between counter 36 and triodes 120 and 121 are such that triode 120 receives a positive potential and conducts whenever the counts recorded on counter 36 are from 1,000 to 1,099. Triode 121 receives a positive potential and conducts whenever the counts recorded on counter 36 exceed 999. It will first be assumed that counter 36 receives a total of 950 pulses during the complete analysis cycle. Thus, relays 106 and 113 remain deenergized at the beginning of the automatic gain adjustment operation. At the beginning of this operation, pulses are transmitted to counters 36 and 86 by operation of relay coil 75. At the same time, current source 66 is connected to motor 47 with switch 110 engaging terminal 111. This rotates motor 47 in a direction to increase the gain of potentiometer 24. Motor 47 continues to be energized until 50 pulses are added to counter 36, thereby making the total count 1,000. At this time, triode 120 conducts to energize relay coil 106. This terminates further rotation of motor 47. However, the rotation of motor 47 during the time that the first 50 pulses are generated should be sufficient to increase the gain of the circuit such that the total number of counts recorded during the following analysis period will be approximately 1,000.

In the event the total number of pulses originally transmitted to counter 36 exceeds 1,000, motor 47 is rotated in the opposite direction. If the total number of counts is 1,050, for example, triode 120 initially conducts to energize relay coil 106. This moves switch 104 out of engagement with terminal 105 so that no current is applied to motor 47 at the beginning of the generation of pulses by relay coil 75. However, conduction by triode 120 is terminated after 50 pulses are applied to counter 36. This closes switch 104 to permit motor 47 to be energized during the generation of the following 50 pulses. At the same time, triode 121 conducts to energize relay 113. In this manner, motor 47 rotates in the opposite direction to decrease the gain of the measuring circuit.

From the foregoing description, it will be evident that the time of rotation of motor 47 is directly proportional to the deviation of the signal on counter 36 from the desired value. In this manner, the amount of adjustment of the potentiometer 24 which is accomplished by motor 47 tends to restore the gain of the detecting circuit to the desired value.

As previously discussed, the recording system of this invention provides a digital representation of voltage values. The final output signals can be printed by typewriter 44 or observed visually by an operator. The use of odd and even counters is valuable in that one can be read-out and reset while the other is recording. However, in some applications only one is necessary when there is sufficient time for these operations. By dividing the individual signals by the total, the percentages of the individual components of a fluid mixture are readily determined.

While the invention has been described in conjunction with a presently preferred embodiment, it should be evident that it is not limited thereto.

What is claimed is:

1. Analysis apparatus comprising an analyzer adapted to provide a plurality of output voltages in sequence, each representative of a component of the material being analyzed; converter means to provide a fluctuating output signal, the frequency of which is proportional to the amplitude of an input voltage; adjustable voltage attenuating means; means to apply the output voltages from said analyzer through said attenuating means to the input of said converter means; first, second and third signal counting means; means to apply all of the output signals from said converter means to said first counting means so as to register the total output of said converter means; means to apply odd and even numbered individual output signals from said converter means to said second and third counting means, respectively, in sequence; means to reset said second and third counting means after each signal is applied thereto; and means responsive to the total output registered on said first counting means at the end of the complete analysis to adjust said attenuating means to increase the voltage transmitted therefrom when the registered output is less than a preselected value and to decrease the voltage transmitted when the registered output exceeds said preselected value.

2. Analysis apparatus comprising an analyzer adapted to provide a plurality of output voltages in sequence, each representative of a component of the material being analyzed; converter means to provide a fluctuating output signal, the frequency of which is proportional to the amplitude of an input voltage; adjustable voltage attenuating means; means to apply the output voltages from said analyzer through said attenuating means to the input of said converter means; first and second signal counting means; means to apply all of the output signals from said converter means to said first counting means so as to register the total output of said converter means; means to apply individual output signals from said converter means to said second counting means in sequence; means to reset said second counting means after each signal is applied thereto; and means responsive to the total output registered on said first counting means at the end of the complete analysis to adjust said attenuating means to increase the voltage transmitted therefrom when the registered output is less than a preselected value and to decrease the voltage transmitted when the registered output exceeds said preselected value.

3. The apparatus of claim 2 wherein said analyzer is a chromatographic analyzer.

4. The apparatus of claim 2 wherein said attenuating means comprises a potentiometer; and wherein said means to adjust comprises a reversible motor having the drive shaft thereof connected to the contactor of said potentiometer, and means responsive to the total output registered on said first counting means to energize said motor for rotation in a first direction when the registered output is less than said preselected value and to energize said motor for rotation in the opposite direction when the registered output exceeds said preselected value.

5. Analysis apparatus comprising an analyzer adapted to provide a plurality of output voltages in sequence, each representative of a component of the material being analyzed; converter means to provide a fluctuating output signal, the frequency of which is proportional to the amplitude of an input voltage; adjustable voltage attenuating means; means to apply the output voltages from said analyzer through said attenuating means to the input of said converter means; first and second signal counting means; means to apply all of the output signals from said converter means to said first counting means so as to register the total output of said converter means; means to apply individual output signals from said converter means to said second counting means in sequence; means to reset said second counting means after each signal is applied thereto; signal recording means; scanning means to transmit individual signals registered on said second counting means to said recording means and to transmit the total output registered on said first counting means to said recording means; and means responsive to the total output registered on said first counting means at the end of the complete analysis to adjust said attenuating means to increase the voltage transmitted therefrom when the registered output is less than a preselected value and to decrease the voltage transmitted when the registered output exceeds said preselected value.

6. The apparatus of claim 5, further comprising timing means to establish signals representative of time, and wherein said scanning means transmits signals from said timing means to said recording means.

7. Analysis apparatus comprising an analyzer adapted to provide a plurality of output voltages in sequence, each representative of a component of the material being analyzed; converter means to provide a fluctuating output signal, the frequency of which is proportional to the amplitude of an input voltage; adjustable voltage attenuating means; means to apply the output voltages from said analyzer through said attenuating means to the input of said converter means; first, second and third signal counting means; means to apply all of the output signals from said converter means to said first counting means so as to register the total output of said converter means; means to apply odd and even numbered individual output signals from said converter means to said second and third counting means, respectively, in sequence; means to reset said second and third counting means after each signal is applied thereto; signal recording means; scanning means to transmit individual signals registered on said second and third counting means to said recording means and to transmit the total output registered on said first counting means to said recording means; and means responsive to the total output registered on said first counting means at the end of the complete analysis to adjust said attenuating means to increase the voltage transmitted therefrom when the registered output is less than a preselected value and to decrease the voltage transmitted when the registered output exceeds said preselected value.

8. Analysis apparatus comprising an analyzer adapted to provide a plurality of output voltages in sequence, each representative of a component of the material being analyzed; converter means to provide a fluctuating output signal, the frequency of which is proportional to the amplitude of an input voltage; a first adjustable voltage attenuating means; a plurality of second adjustable voltage attenuating means; means to apply the output voltages from said analyzer through said first adjustable voltage attenuating means and respective ones of said plurality of second adjustable voltage attenuating means to the input of said converter means; first and second signal counting means; means to apply all of the output signals from said converter means to said first counting means so as to register the total output of said converter means; means to apply individual output signals from said converter means to said second counting means in sequence; means to reset said second counting means after each signal is appled thereto; and means responsive to the total output registered on said first counting means at the end of the complete analysis to adjust said first adjustable voltage attenuating means to increase the voltage transmitted therefrom when the registered output is less than a preselected value and to decrease the voltage transmitted when the registered output exceeds said preselected value.

9. Analysis apparatus comprising an analyzer adapted to provide a plurality of output voltages in sequence, each representative of a component of the material being analyzed; converter means to provide a fluctuating output signal, the frequency of which is proportional to the amplitude of an input voltage; adjustable voltage attenuating means; means to apply the output voltages from said analyzer through said attenuating means to the input of said converter means; signal scaling means to provide an output signal having a frequency which is a preselected fraction of the input signal applied thereto; means to apply the output of said converter means to the input of said scaling means; first and second signal counting means; means to apply all of the output signals from said scaling means to said first counting means so as to register the total output of said converter means; means to apply individual output signals from said scaling means to said second counting means in sequence; means to reset said second counting means after each signal is applied thereto; and means responsive to the total output registered on said first counting means at the end of the complete analysis to adjust said attenuating means to increase the voltage transmitted therefrom when the registered output is less than a preselected value and to decrease the voltage transmitted when the registered output exceeds said preselected value.

10. Apparatus comprising, in combination, means for producing a plurality of voltages in sequence; means associated with said means for producing for varying the gain of said means for producing; converter means to provide a fluctuating output signal, the frequency of which is proportional to the amplitude of an input voltage; means for applying the output of said means for producing to the input of said converter means; first and second signal counting means; means to apply all of the output signals from said converter means to said first counting means so as to register the total output of said converter means; means to apply individual output signals from said converter means to said second countnig means in sequence; means to reset said second counting means after each signal is applied thereto; and means responsive to the total output registered on said first counting means at the end of a predetermined number of said plurality of voltages to adjust said means for varying the gain of said means for producing to increase the voltage transmitted from said means for producing when the registered output is less than a preselected value and to decrease the voltage transmitted from said means for producing when the registered output exceeds said preselected value.

11. Apparatus for recording a plurality of voltages which are produced in sequence comprising, in combination, means for producing a plurality of voltages in sequence; means associated with said means for producing for varying the gain of said means for producing; converter means to provide a fluctuating output signal, the frequency of which is proportional to the amplitude of an input voltage; means for applying the output of said means for producing to the input of said converter means; first and second signal counting means; means to apply all of the output signals from said converter means to said first counting means so as to register the total output of said converter means; means to apply individual output signals from said converter means to said second counting means in sequence; means to reset said second counting means after each signal is applied thereto; signal recording means; scanning means to transmit individual signals registered on said second counting means to said recording means and to transmit the total output registered on said first counting means to said recording means; and means responsive to the total output registered on said first counting means at the end of a predetermined number of said plurality of voltages to adjust said means for varying the gain of said means for producing to increase the voltage transmitted from said means for producing when the registered output is less than a preselected value and to decrease the voltage transmitted from said means for producing when the registered output exceeds said preselected value.

12. Apparatus comprising means for producing an output in a cyclic manner, each cycle comprising a plurality of output voltages in sequence; converter means to provide a fluctuating output signal, the frequency of which is proportional to the amplitude of an input voltage; means for applying the output voltages from said means for producing to an input of said converter means; counting means; means to apply individual output signals from said converter means to said counting means in sequence; means to reset said counting means after each signal is applied thereto; means for registering the total output of said converter means; and means responsive to the total output registered on said means for registering at the end of a cycle to adjust the gain of said means for producing to increase the voltage transmitted therefrom when the registered total output is less than a preselected value and to decrease the voltage transmitted when the registered total value exceeds said preselected value.

13. Apparatus in accordance with claim 12 further comprising means for recording the output of said counting means and said means for registering.

14. Apparatus in accordance with claim 13 wherein said means for producing comprises an analyzer adapted to provide a plurality of output voltages in sequence, each representative of a component of the material being analyzed.

15. Apparatus in accordance with claim 14 wherein said analyzer is a chromatographic analyzer.

References Cited in the file of this patent

UNITED STATES PATENTS

| | | |
|---|---|---|
| 2,123,142 | McMaster | July 5, 1938 |
| 2,339,754 | Brace | Jan. 25, 1944 |
| 2,436,104 | Fisher et al. | Feb. 17, 1948 |
| 2,446,874 | Geffner et al. | Aug. 10, 1948 |
| 2,496,912 | Grosdoff | Feb. 7, 1950 |
| 2,517,121 | Liston | Aug. 1, 1950 |
| 2,652,977 | Levy | Sept. 22, 1953 |
| 2,720,612 | Leonard | Oct. 11, 1955 |
| 2,759,784 | Burke | Aug. 21, 1956 |
| 2,835,868 | Lindesmith | May 20, 1958 |
| 2,933,364 | Campbell | Apr. 19, 1960 |
| 3,005,911 | Burhans | Oct. 24, 1961 |